3,049,497
THORIUM PHOSPHATE MATRIX LUMINESCENT MATERIALS
Peter Whitten Ranby and Doreen Yvonne Hobbs, London, England, assignors to Thorn Electrical Industries Limited, London, England
No Drawing. Filed Feb. 25, 1957, Ser. No. 641,806
Claims priority, application Great Britain Feb. 22, 1956
5 Claims. (Cl. 252—301.4)

This invention relates to luminescent materials for use for example in fluorescent discharge lamps, high pressure mercury vapour lamps, cathode ray tube screens and X-ray screens. An object of this invention is to provide new luminescent materials.

According to the present invention there is provided an artificial luminescent material characterized in that it comprises a thorium phosphate matrix activated by up to 25%, by weight of the matrix, of an activator or activators consisting of one or more of copper, cerium, antimony and lead. Such a material including copper as an activator may also include as activator or activators one or more of lithium, thallium and silver. A material including one or more of copper and thallium, cerium, antimony and lead may also include up to 10% of manganese, by weight of the matrix.

Also according to the present invention there is provided a method of making an artificial luminescent material comprising heating at a temperature above 800° C. an initial mixture characterised in that the initial mixture comprises a thorium phosphate matrix, or a mixture of compounds that will form a thorium phosphate matrix on such heating and up to 25%, by weight of the matrix, of an activator or activators consisting of one or more of copper, cerium, antimony and lead, in the form of a compound or compounds thereof. An initial mixture including an activating amount of copper may also include as an activator or activators one or more of lithium, thallium and silver. An initial mixture including one or more of copper and thallium, cerium, antimony and lead may also include up to 10% of manganese, by weight of the matrix.

Preferably the proportions of the activators when present are 0.005 to 25% of copper, 0.1 to 20% of cerium, 0.1 to 20% of antimony, 4 to 16% of lead, 0.05 to 15% of silver, 0.05 to 20% of thallium, up to 5% of lithium, and up to 10% of manganese, all by weight of the matrix.

More preferably the proportions of the activators when present are 0.01 to 5% of copper, 1.0 to 10% of cerium, 2 to 12% of antimony, 8 to 12% of lead, 1.5 to 7% of silver, 0.1 to 15% of thallium, up to 5% of lithium, and up to 10% of manganese, all by weight of the matrix.

It may be noted that a thorium phosphate material activated with copper alone emits a yellow-orange fluorescence when excited by 2537 A.U. radiation, and while no appreciable change has been observed in the colour of the fluorescence when manganese alone is incorporated, the colour is shifted to longer wavelengths when, for example, thallium and manganese are both incorporated, the material activated by copper, thallium and manganese giving an orange-pink fluorescence under excitation by 2537 A.U. radiation.

The compound or compounds of the activators can be added to the initial mixture in various forms such as the oxides, hydroxides, basic carbonates, nitrates, halides, phosphates, acetates, sulphates etc.

The mixture of materials used to form the thorium phosphate matrix on heating may be, for example, one or more of the oxide, hydroxide, basic carbonate, oxalate, nitrate etc., together with compounds of phoshorus such as an acid or oxide. Preferably the compound of phosphorus is an ammonium phosphate. Alternatively the mixture may combine a precipitated thorium phosphate with additional thorium oxide if necessary, or with an additional compound of phosphorus (e.g. ammonium phosphate) if necessary.

An initial mixture may be prepared by co-precipitating together from aqueous solution, e.g. by, adding a solution of a soluble phosphate to a solution containing thorium nitrate and the nitrate or nitrates of the activator or activators. For example, an initial mixture comprising thorium and copper phosphates may be produced from a solution of the respective nitrates by use of ammonium phosphate.

There is some evidence that a mildly reducing atmosphere or an atmosphere of steam during the thermal preparation of the luminescent materials gives products which are slightly brighter than those prepared by simply heating in open crucibles in a muffle furnace. The copper-activated material shows a yellow-orange luminescence when excited by short wave ultra-violet and a yellowish luminescence when excited by long wavelength ultra-violet; the intensity of the luminescence of this material when excited by long wavelength ultra-violet is usually brighter when the temperature of the luminescent material is above room temperature, and such a material is of especial interest in electric devices which become hot during use, e.g. high pressure mercury vapour lamps.

Methods of preparing luminescent materials in accordance with the invention will now be described by way of example. The starting materials used should be of the high degree of purity which is recognised in the art to be necessary for the preparation of luminescent materials.

*Example 1*

100 gms. thorium oxide ($ThO_2$)
26.7 gms. diammonium hydrogen phosphate (($NH_4)_2HPO_4$)
9.2 gms. copper acetate (($CH_3COO)_2Cu.H_2O$)

are intimately mixed together and then heated for half an hour at 1260° C. in an open crucible.

When cool the product emits a yellow-orange fluorescence when excited to 2537 A.U. radiation or a yellowish fluorescence under 3650 A.U. radiation. The material may be re-heated for a quarter of an hour at 1200° C. in an atmosphere of steam to improve the intensity of the fluorescence. Alternatively, the whole of the heating operation may be carried out in an atmosphere of steam. The final product may be ground, washed, dried and then sieved.

*Example 2*

8.5 gms. thorium oxide ($ThO_2$)
3.0 gms. diammonium hydrogen phosphate (($NH_4)_2HPO_4$)
0.6 gm. antimony oxide ($Sb_2O_3$)

are intimately mixed together and heated for half an hour at 800° C. in an open crucible, then ground and reheated at 1240° C. for half an hour. If necessary the material is reheated in steam for half an hour. When cool the product emits a blue luminescence when irradiated with 2537 A.U. radiation.

*Example 3*

If the method of Example 2 is modified by including 0.25 gm. manganese chloride ($MnCl_2.4H_2O$) in the mixture, the final product emits a whitish fluorescence.

*Example 4*

100 gms. thorium oxide ($ThO_2$)
28 gms. diammonium hydrogen phosphate (($NH_4)_2HPO_4$)
9.3 gms. thallous nitrate ($TlNO_3$)
1.33 gms. manganese chloride ($MnCl_24H_2O$)
2.66 gms. copper acetate (($CH_3COO)_2Cu.H_2O$)

are intimately mixed together and then heated at 800° C. for half an hour in a closed crucible. When cool the product is ground and reheated at 1140° C. for half an hour. If necessary the product can be reheated at 1140° C. in an atmosphere of steam. The final product emits a bright orange-pink fluorescence when excited by 2537 A.U. radiation.

*Example 5*

If the method of Example 4 is modified by using only 4 gms. thallous nitrate, 8 gms. manganese chloride, and only 1.33 gms. copper acetate, the final product emits a pink-fluorescence when excited by 2537 A.U. radiation.

*Example 6*

7.5 gms. thorium oxide ($ThO_2$)
2.1 gms. diammonium hydrogen phosphate
$((NH_4)_2HPO_4)$
0.3 gm. manganese chloride ($MnCl_2 4H_2O$)
0.8 gm. lead fluoride ($PbF_2$)

are intimately mixed together and then fired at 800° C. for half an hour in a closed crucible. After grinding the material is refired at 1140° C. The material can be refired for a further half hour at 1140° C. in steam in order to obtain the maximum intensity of fluorescence.

The resulting material emits an orange-pink fluorescence under 2537 A.U. radiation.

*Example 7*

7.5 gms. thorium oxide ($ThO_2$)
2.1 gms. diammonium hydrogen phosphate
$((NH_4)_2HPO_4)$
0.05 gm. copper acetate $((CH_3COO)_2Cu.H_2O)$
0.75 gm. silver nitrate ($AgNO_3$)

are intimately mixed together and then fired at 800° C. for half an hour. After grinding the material is refired at 1100° C. The material can be refired for a further quarter of an hour at 1100° C. in steam in order to obtain the maximum intensity of fluorescence. The resulting material is a white powder which emits a yellow fluorescence when irradiated with either long (3650 A.U.) or short (2537 A.U.) wavelength ultraviolet.

*Example 8*

10 gms. thorium oxide ($ThO_2$)
7.3 gms. diammonium hydrogen phosphate
$((NH_4)_2HPO_4)$
0.07 gm. copper acetate $((CH_3COO)_2Cu.H_2O)$
0.5 gm. lithium carbonate ($Li_2CO_3$)

are intimately mixed together and then heated for half an hour at 800° C.; the product is ground and reheated for half an hour at 1100° C. followed by a further heating at 1100° C. for a quarter of an hour in steam.

When cool the product is a white powder which emits a bright blue fluorescence under 2537 A.U. radiation.

We claim:

1. An artificial luminescent material characterized in that it consists essentially of a thorium phosphate matrix activated by at least one activator by weight of the matrix selected from the group consisting of 0.005 to 25% copper, 0.1 to 20% cerium, 0.1 to 20% antimony, 4 to 16% lead.

2. The artificial luminescent material as defined in claim 1 including up to 10% of manganese, by weight of the matrix.

3. An artificial luminescent material as defined in claim 1 wherein copper is the activator together with at least one co-activator by weight of the matrix selected from the group consisting of 0.005 to 15% silver, 0.05 to 20% thallium and up to 5% lithium.

4. A method of preparing an artificial luminescent material consisting essentially in heating at a temperature of above 800° C. an initial mixture characterized in that the initial mixture comprises a member selected from the group consisting of a thorium phosphate matrix, and a mixture of compounds that will form a thorium phosphate matrix on such heating together with at least one activator by weight of the matrix selected from the group consisting of 0.005 to 25% copper, 0.1 to 20% cerium, 0.1 to 20% antimony and 4 to 16% lead.

5. A method according to claim 4 wherein the initial mixture contains by weight of the matrix 0.005 to 25% copper together with at least one coactivator selected from the group consisting of lithium, thallium and silver.

References Cited in the file of this patent

UNITED STATES PATENTS

| | | |
|---|---|---|
| 2,049,765 | Fischer | Aug. 4, 1936 |
| 2,668,148 | Kroger | Feb. 2, 1954 |
| 2,692,349 | Ouweltjes | Oct. 19, 1954 |
| 2,709,766 | Nagy | May 31, 1955 |
| 2,714,095 | Kobuke | July 26, 1955 |

FOREIGN PATENTS

| | | |
|---|---|---|
| 73,114 | Netherlands | Aug. 15, 1953 |